March 17, 1936.  H. G. BEEDE  2,034,279

GARMENT PRESSING MACHINE

Filed Aug. 12, 1931  5 Sheets-Sheet 1

INVENTOR.
Herbert G. Beede
BY
ATTORNEYS.

March 17, 1936. H. G. BEEDE 2,034,279
GARMENT PRESSING MACHINE
Filed Aug. 12, 1931 5 Sheets-Sheet 2
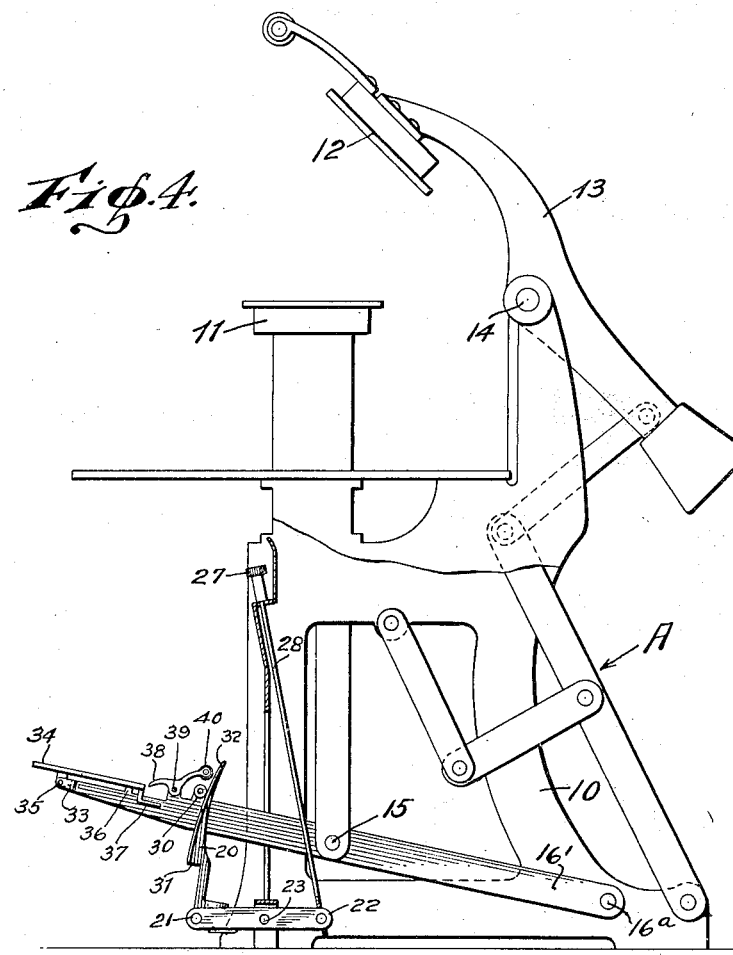
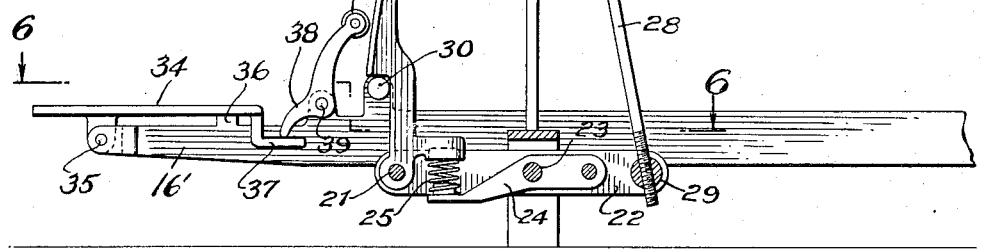
INVENTOR.
Herbert G. Beede
BY
ATTORNEYS.

March 17, 1936. H. G. BEEDE 2,034,279
GARMENT PRESSING MACHINE
Filed Aug. 12, 1931 5 Sheets-Sheet 4
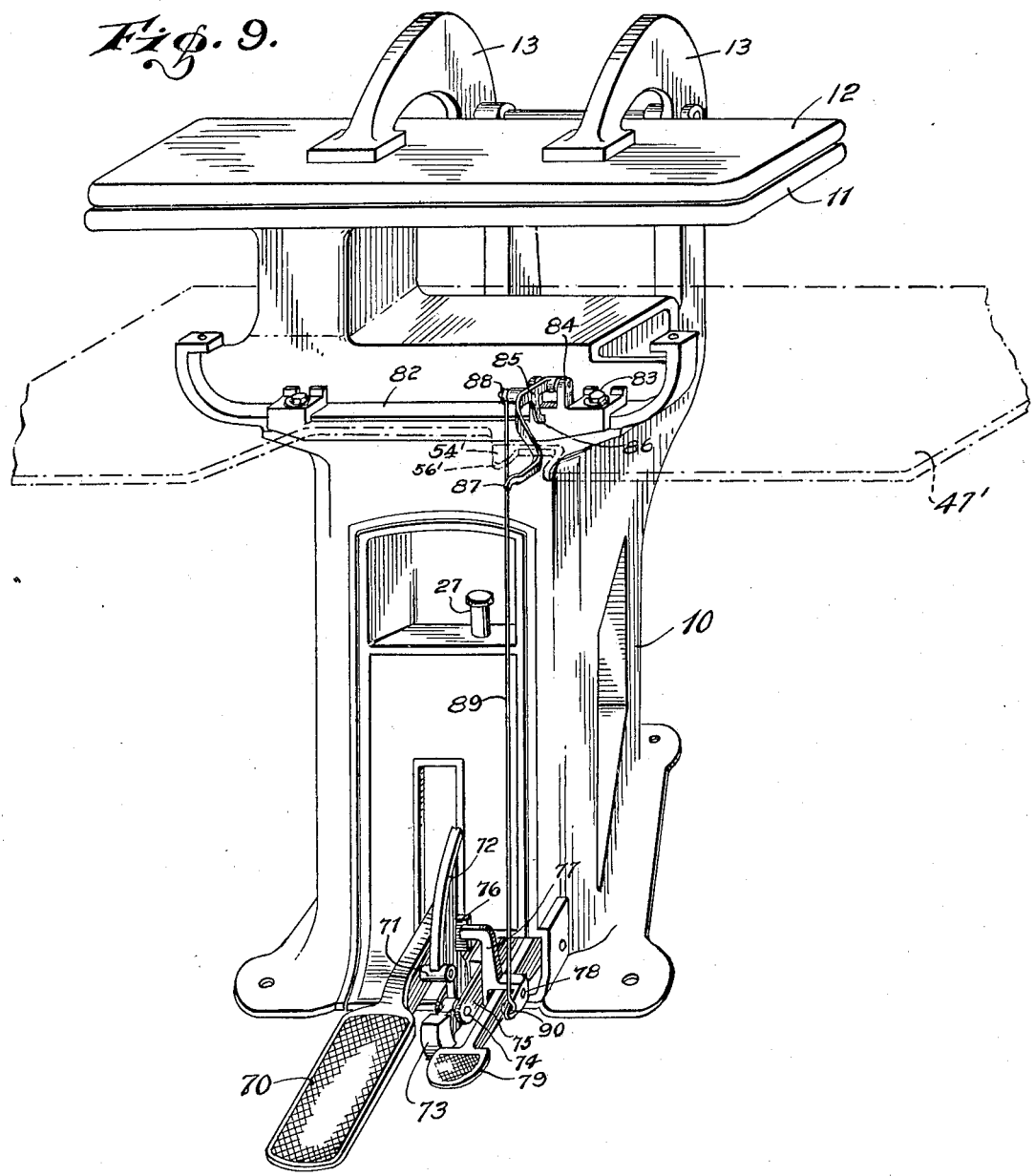
INVENTOR
Herbert G. Beede
BY
ATTORNEY March 17, 1936.  H. G. BEEDE  2,034,279
GARMENT PRESSING MACHINE
Filed Aug. 12, 1931   5 Sheets-Sheet 5
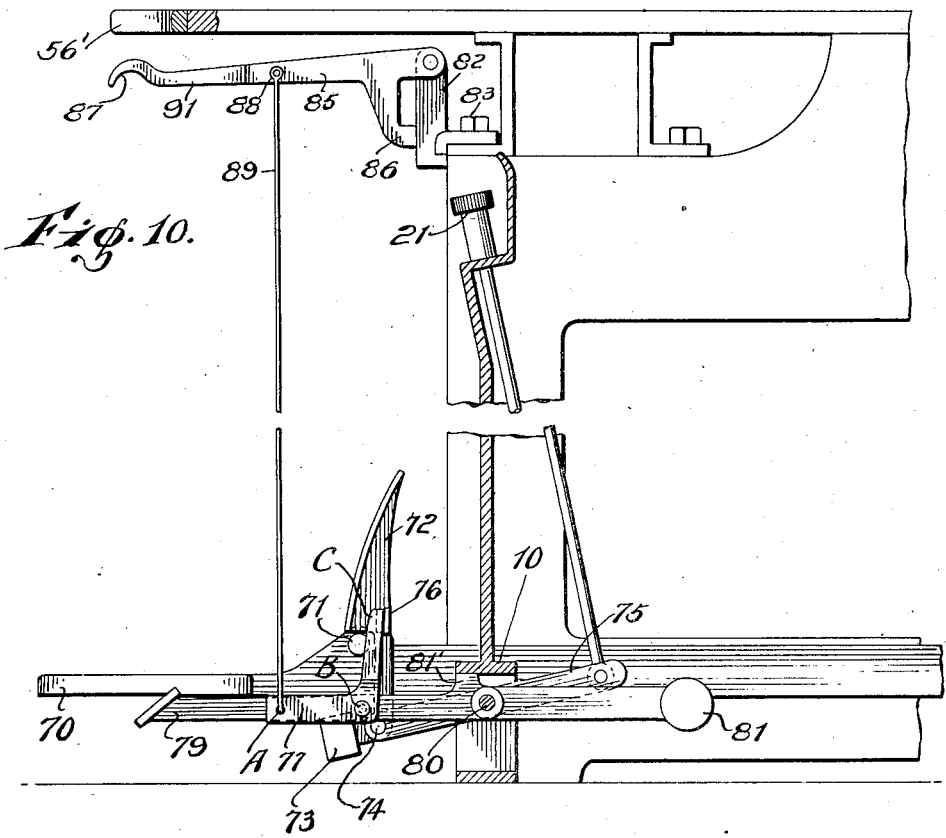
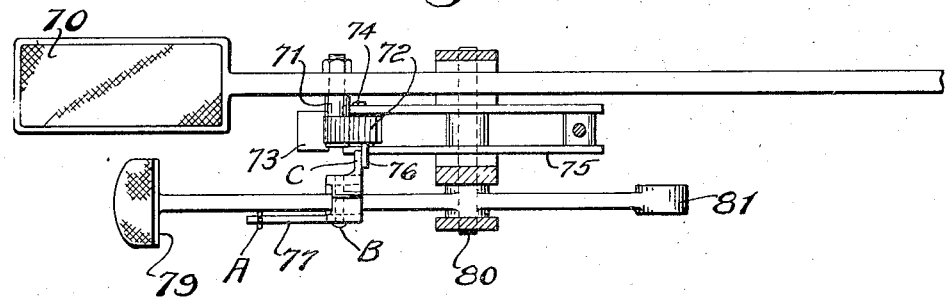
INVENTOR.
Herbert G. Beede
BY
ATTORNEYS.

Patented Mar. 17, 1936

2,034,279

UNITED STATES PATENT OFFICE 2,034,279

GARMENT PRESSING MACHINE

Herbert G. Beede, Pawtucket, R. I.

Application August 12, 1931, Serial No. 556,694

2 Claims. (Cl. 74—539)

My invention relates to garment pressing machines such as are used in tailoring, dry cleaning, laundering and similar establishments for steaming and pressing clothing of various kinds, and the invention relates particularly to latching mechanism for holding the pressing elements closed and for releasing the latching mechanism so that the movable pressing element can move to open position.

The objects of the invention include, first, the provision of latching mechanism automatically operable upon closing of the press to releasably maintain the pressing elements in pressing position; second, the provision of means for effecting release of the latching mechanism to allow the pressing elements to return to open position either in combination with the means for effecting closing of the press or by independent means operable from convenient points by the hand or foot of the operator.

All of the objects and advantages of the invention will become apparent and will be referred to during the course of the following detail description of the accompanying drawings wherein are shown preferred embodiments of the invention and in which Fig. 1 is a side plan view of a pressing or ironing machine with the invention applied thereto;

Fig. 4 is a view similar to Fig. 1 showing a treadle operated release for the latch;

Fig. 5 is an enlarged detail side view showing the latching and releasing means illustrated in Fig. 4;

Fig. 6 is a view on the line 6—6 of Fig. 5;

Fig. 9 is a perspective view of a pressing or ironing machine showing another form of the invention applied thereto;

Fig. 10 is a side plan foreshortened view of the apparatus shown in Fig. 6 with slight modification; and Fig. 11 is a view on the line 8—8 of Fig. 7.

Figure 1:
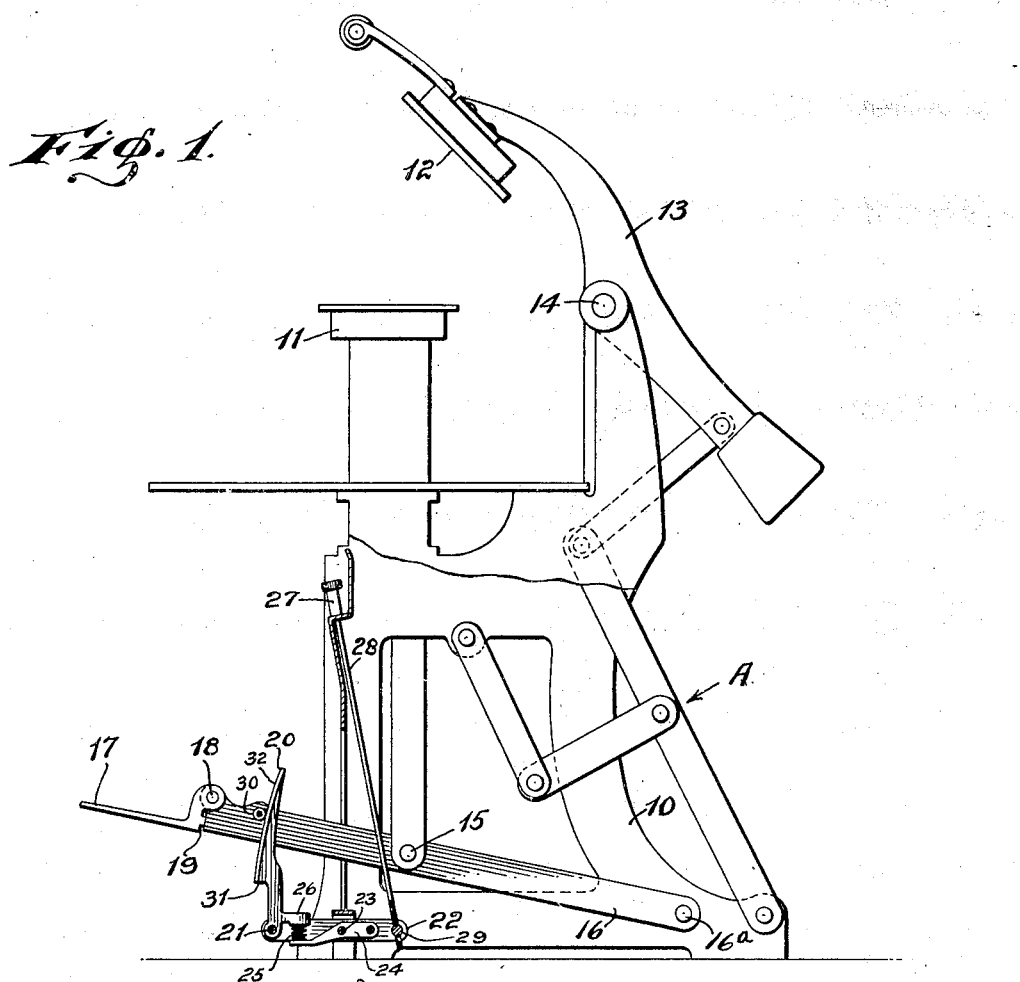
Figure 2:
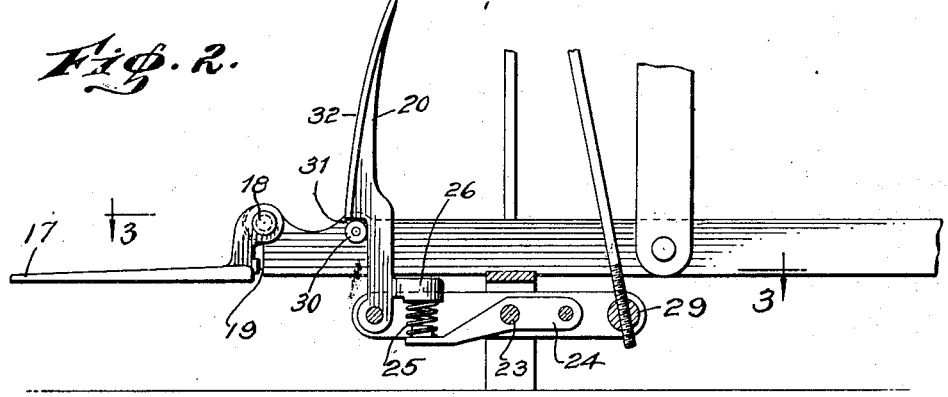
Fig. 2 is an enlarged detail side view showing the form of latching mechanism illustrated in Fig. 1 with parts in section.
Figure 3:
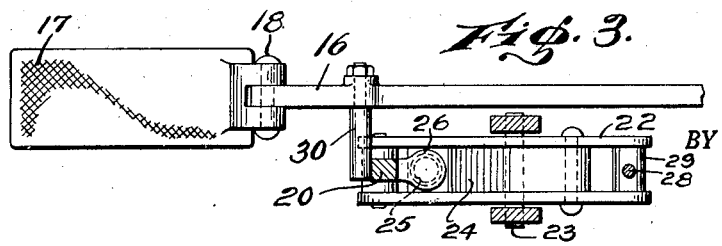
Fig. 3 is a view taken on the line 3—3 of Fig. 2.

Referring to Figs. 1–3 of the drawings, the numeral 10 designates a supporting frame of a garment pressing or ironing machine having a lower pressing element or buck 11 and an upper movable pressing head 12 carried on the swingable frame 13 pivoted at 14 to the frame. The arm 13 is actuated by a series of toggles indicated generally at A and connected at 15 to the pedal lever 16 which is pivoted on the frame 10 at 17. The pedal lever 16 projects forwardly beyond the frame and has applied to its outer end of a foot pedal 17 which is pivoted at 18 to the lever 16. The inner face of the pedal 17 abuts the outer end of the lever 16 at 19, being swingable on pivot 18 upwardly therefrom, but when downward pressure is applied to the pedal it will abut the lever at 19 and move the same downwardly. A latch 20 is pivoted at 21 between the rocking levers 22 which are secured to the frame at 23 to one side of the lever 16. The rocking levers 22 are separated by a spacer block 24 at one end of which is mounted a compression spring 25. The upper end of the compression spring is engaged by the projection 26 on the latch so that the spring maintains constant pressure on the latch urging it to move forwardly. An adjusting screw is connected to the rod 28, the lower end of which has screw threaded engagement at 29 with the rocking levers 22 so that the vertical position of the latch may be altered at will.

A lug or bolt 30 is carried by the lever 16 and extends across the front of the latch 20, the latch being provided with a shoulder 31 to engage over the lug 30 and with a curved face 32 against which the lug rides when the lever 16 moves upwardly. The curved face 32 is preferably formed in an arc corresponding to the arc described by the lug 30 during the swinging movement of the pedal lever 16.

It should be apparent from the foregoing, that the toggle mechanism A is operated to move the pressing head 12 down to the buck 11 by pressure exerted by the foot on the pedal 17. As the lever 16 moves downwardly, the extension 30 rides against the face 32 until it has passed the end thereof at which time the spring 25 will throw the latch 20 forwardly to position the shoulder 31 over the top of the extension 30 thus locking the head against the buck 11. The toggle mechanism is released to return the head 12 to open position simply by pushing or kicking the latch 32 back so that the extension 30 will be disengaged from under the shoulder 31 and can ride upwardly on the arcuate face 32.

Referring to Figs. 4–6, the machine and latching mechanism is the same as that shown in Figs. 1–3 but there is provided in connection therewith, releasing mechanism operable by the same pedal which serves to close the machine. In this form of the invention a special foot treadle lever 16' is provided having bearings 33 to which the treadle 34 is pivotally connected intermediate its ends as indicated at 35. The lever 16' has on its upper face a stop 36 against which the treadle 34 is normally held by gravity as shown in the drawings. The foot treadle 34 has a rearwardly extending lug or projection 37 at one end beneath the lower end 38 of the crank lever which is pivotally connected to the lever 16' at 39. The upper end of the crank lever carries a roller or bumper 40 adjacent the arcuate face 32 of the latch 20.

The apparatus shown in Figs. 4–6 is operated as follows. Pressure on the treadle 34 between the pivot 35 and the projection 37, which may conveniently be applied by the ball of the foot, will move the lever 16' down until the projection 30 engages under the shoulder 31 to lock the head in closed position as described in connection with Figs. 1–3. Pressure on the end of the foot treadle 34 beyond pivot 35, which may conveniently be applied by the heel of the foot, will tip the treadle back so that the projection 37 will raise the end 38 of the crank lever and partly rotate the crank lever urging roller or bumper 40 against the arcuate face 32 to move the shoulder 31 of the latch from engagement with the projection 30 to permit the lever 16' to move upwardly.

Figure 7:
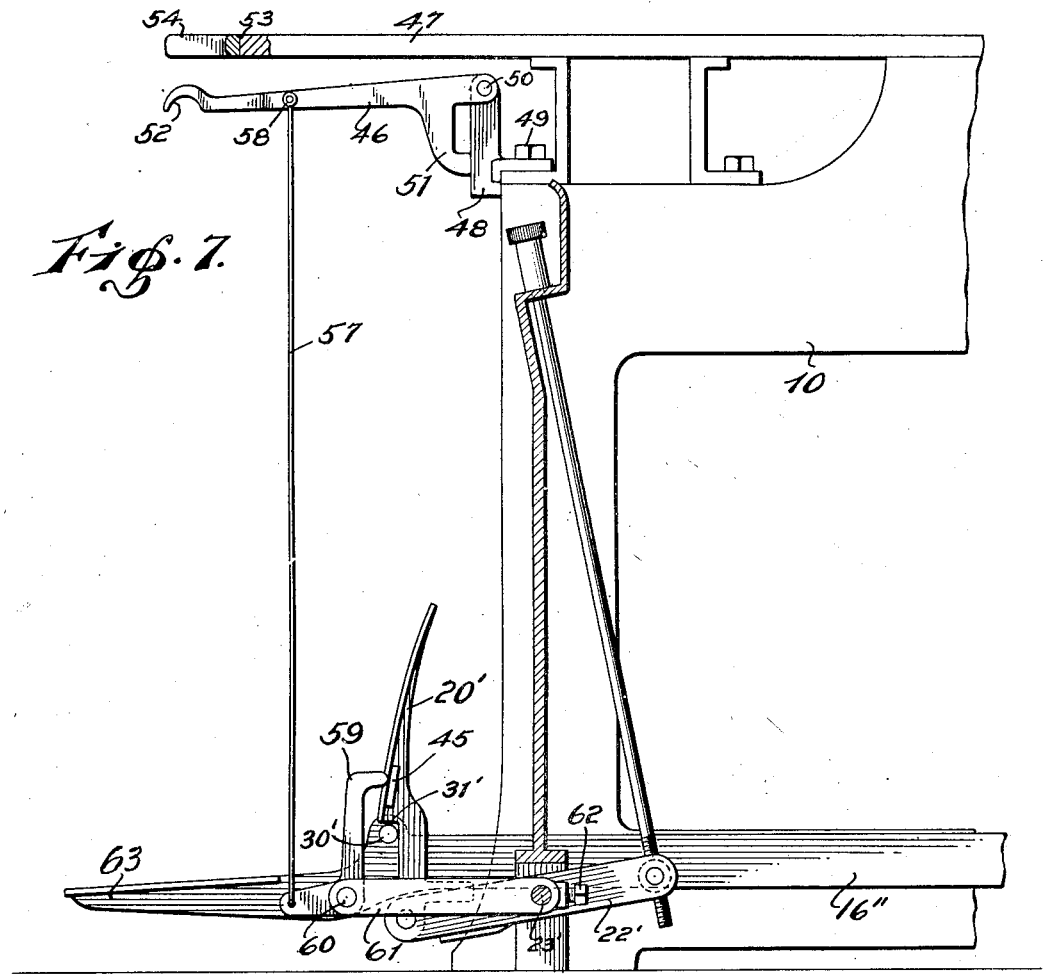
Fig. 7 is a side elevation of a portion of a pressing machine with parts in section showing another form of the invention applied thereto.
Figure 8:
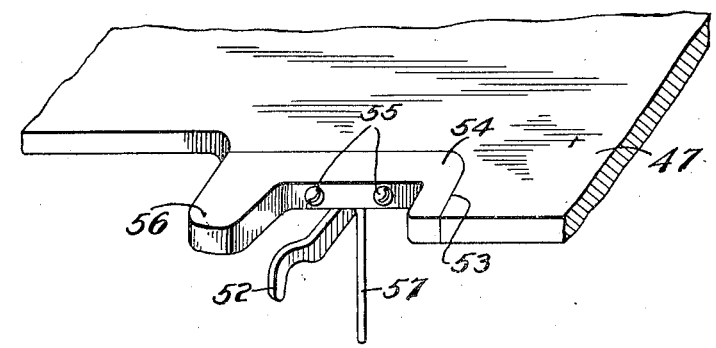
Fig. 8 is an enlarged fragmentary perspective view of a portion of the releasing mechanism.

Referring to Figs. 7 and 8, the latch or locking mechanism is the same as described above but the manually operated latch releasing mechanism is designed for use with foot treadles which do not function to open the press, the foot treadles being either detachable or formed integral with the pedal lever 16''. In this form of the invention the latch 20' is provided with a lug or lateral extension 45 through which the release motion is transmitted to the latch from a lever 46 operated from a point adjacent the table 47 which, it will be understood, is mounted on the frame 10 adjacent the buck.

A bracket 48 is mounted on the frame and held in place by screws 49. The lever 46 is pivotally connected at 50 to bracket 48 and is provided with an extension 51 which acts as a stop to downward movement of the lever 46 by abutting the bracket 48. The outer end 52 of the lever 46 is hook shaped for engagement by the fingers of the operator and is located approximately in alinement with the front edge of the press table and a short distance therebelow. The press table is cut away at 53 to allow for insertion of a plate 54 which is held to the press table by the screws 55. The plate is provided with a forwardly projecting portion 56 to accommodate the thumb of the operator.

A rod 57 is connected to the lever 46 intermediate the pivot 50 and hooked end 52 at 58 and to the trip crank 59 which is pivotally connected at 60 to bracket 61 which is mounted on an extension 23' of the pivot for the locking levers 22'. The bracket 61 is prevented from rotation by the set screw 62 or other means engaging between the extension 23' and bracket 61. The upper end of the trip crank 59 is disposed in alinement with or in abutting engagement with the extension 45 when the press is in closed position as shown in Fig. 7, and the shoulder 31' of the latch 20' is moved from engagement with the lug 30' to permit opening of the press by operation of the lever 46, it being understood that the latch has been moved to locked position in the same manner as described in connection with Figs. 1–5.

When the operator presses down with his foot on the treadle 63 which is shown as an integral of part of the pedal lever 16'' the lug 30' is brought down along the front face of the latch 20' until it has passed the lower end thereof at which time the latch moves forwardly so that the shoulder 31' engages over the lug 30' as shown in Fig. 7. To open the press the operator places his right thumb on the extension 56 of the plate 54 and places his fingers or forefinger under the hooked end 52 of the lever 46 which is raised by a squeezing action between thumb and forefinger. As the lever 46 moves upwardly it exerts a pull through rod 57 on the end of crank 59 turning the same on pivot 60 so that the upper end of the crank presses against the extension or lug 45 thus moving the latch 20' backwardly until the shoulder 31' is moved from engagement with the lug 30'. After the latch has been released the operator merely withdraws his fingers from the hook 52 so that the lever 46 will move downwardly under the action of gravity until the extension 51 abuts the bracket 48 at which time the releasing mechanism is in position to again release the latch 20' after the press has been closed.

In Figs. 9–11, I have shown a construction and arrangement of releasing means for the latch comprising a combination of hand lever and foot pedal mechanism, the foot pedal being separate from the main press treadle which operates the toggle mechanism.

Referring to Fig. 9, head 12 carried by the arms 13 and the buck 11 on frame 10 and other parts of the machine, are of substantially the same construction and arrangement as the machines shown in Figs. 1 and 4. The closing movement of the head 12 is initiated by pressure on the treadle 70 which may be an integral part of the foot pedal lever as shown in Fig. 9 or a detachable treadle like that shown in Fig. 1. The operating lever carries the projecting lug 71 which corresponds to the lug 30 for engagement under the shoulder of the keeper 72 to lock the press closed. Instead of the arrangement of the compression spring to urge the keeper 72 forward, I have shown the keeper as provided with a counterbalancing weight 73 which tends to move the keeper forward by swinging movement on pivot 74 extending through the rocking levers 75 which are adjustable by means of the screw 27 as described in connection with Figs. 1–3. The keeper 72 is also provided with a projection or laterally extending lug 76 which is disposed in front of the upper end of the crank lever 77 pivoted at 78 to the releasing pedal 79, which as shown in Fig. 10, is pivoted to the frame at 80 and has at its inner end a counter-balancing weight 81 which tends to maintain the pedal in substantially horizontal position with the stop 81' on the lever abutting the horizontal portion on the frame 10. The movement of the lug 71 under the shoulder of the keeper 72 is effected in the same manner as described in connection with the other figures, it being understood that the counter-balancing weight 73 tends to keep the forward face of the keeper against the projection 71 until the projection has reached the lower end of the face, at which time the keeper will be thrown forward by the weight to engage over the projection. The keeper is moved out of locking engagement with the projection 71 by means of the crank lever 77 which operates in the manner described in connection with the crank 59 of Figs. 7-8, under the action of mechanism now to be described.

To the upper front portion of the frame 10, the bracket 82 is secured by bolts 83. The bracket has upstanding lugs 84 between which is pivoted the hand lever 85 which comprises a stop 86 to engage the front of the bracket 82 and an outwardly extending shank with the finger hook 87 at its forward end. The plate 54' is secured to the front of the table 47' and has the thumb rest 56'. The lever 85 is connected at 88 to the rod 89 which has its other end connected to this crank lever 77 at 90.

In Fig. 10, I have shown the same arrangement as in Fig. 9 with the exception of the hand lever 91 which is of the same construction and arrangement as that shown and described in Fig. 7. Also in Fig. 10, I have indicated the connection 90 as A, the pivot 78 of the crank lever as B, and the upper end of the crank lever as C, and in connection with the description of the operation about to be given, reference may conveniently be had to Fig. 10.

The parts are moved to locked position when the treadle lever 70 is depressed so that the extension 71 is brought low enough for the latch 72 to move forwardly on pivot 74 under the action of counterweight 73. To release the latch the operator may place his thumb over the projection 56' with his fingers under the hook on the lever 85 or 91 and raise the lever so that the rod pulling at point A will rock the crank lever on its pivot B to move the end C against the projection 76 to move the latch 72 back until the shoulder is clear of the projection 71.

It will be noted that the crank lever functions as a lever of the first class when release is effected through the hand lever from above as the effort is applied at A and the fulcrum is at B between the point where the effort is applied and the point C where the power is transmitted.

The latch may also be released by depressing the foot pedal 79 which causes the crank lever to act as a lever of the third class for it then fulcrums at A, receives the power at B and transmits the power at C to move the latch 72 out of engagement with the extension 71.

I claim:—

1. Latching mechanism for the operating lever of garment presses and the like, comprising a pivoted latch having a portion disposed beside the operating lever, a projection on the lever, means normally urging said portion of the latch into engagement with said projection, said latch having a recess to receive the projection when the lever is moved to close the press, a tiltable treadle on the actuating lever, and a crank lever pivotally mounted between said treadle and latch, the treadle having a portion to engage one end of the crank lever to move the crank lever against the latch to release the projection from the recess to permit opening of the press.

2. Latching mechanism for foot operated levers of garment presses and the like comprising, a latch, cooperating elements on the latch and foot lever engageable by movement of the foot lever in one direction to hold the foot lever against return movement, a tiltable treadle on the foot lever, and a crank lever pivotally mounted between said treadle and latch, the treadle having a part engageable with the crank lever to cause the latter to disengage said elements to permit return movement of the foot lever.

HERBERT G. BEEDE.